United States Patent
Lussey (10) Patent No.: US 11,972,876 B2
(45) Date of Patent: Apr. 30, 2024

(54) COMPOSITE MATERIALS

(71) Applicant: David Lussey, Richmond (GB)

(72) Inventor: David Lussey, Richmond (GB)

(*) Notice: Subject to any disclaimer, the term of this patent is extended or adjusted under 35 U.S.C. 154(b) by 0 days.

(21) Appl. No.: 17/270,909

(22) PCT Filed: Aug. 27, 2019

(86) PCT No.: PCT/GB2019/052393
§ 371 (c)(1),
(2) Date: Feb. 24, 2021

(87) PCT Pub. No.: WO2020/039216
PCT Pub. Date: Feb. 27, 2020

(65) Prior Publication Data
US 2021/0225552 A1    Jul. 22, 2021

(30) Foreign Application Priority Data

Aug. 24, 2018  (GB) .................................. 1813857
Aug. 16, 2019  (GB) .................................. 1911813

(51) Int. Cl.
*H01B 1/22*  (2006.01)
*G01L 1/14*  (2006.01)
(Continued)

(52) U.S. Cl.
CPC ............... *H01B 1/22* (2013.01); *G01L 1/142* (2013.01); *G01L 1/205* (2013.01); *H01B 1/24* (2013.01)

(58) Field of Classification Search
CPC ........................... C01B 31/04; C10M 125/02
See application file for complete search history.

(56) References Cited

U.S. PATENT DOCUMENTS

| | | | |
|---|---|---|---|
| 4,414,321 A | 11/1983 | Miyakawa et al. | |
| 2003/0044705 A1 | 3/2003 | Sano et al. | |
| 2007/0114486 A1* | 5/2007 | Takeuchi | F16J 15/43 |
| | | | 252/503 |

FOREIGN PATENT DOCUMENTS

| | | | | |
|---|---|---|---|---|
| KR | 100936013 B1 * | 1/2010 | .......... | C10M 125/02 |
| WO | WO 2007129088 A1 * | 11/2007 | .......... | C01B 31/04 |
| WO | WO 2017/103592 A1 * | 6/2017 | .......... | G01L 1/20 |

OTHER PUBLICATIONS

Chen Jie et al: "Preparation and characterization of Fe3O4 nanoparticles used in intelligent polymer gels and intelligent polymer gels drived by magnetic fields", Nano/Micro Engineered and Molecular Systems, 2008. NEMS 2008. 3rd IEEE International Conference on, IEEE, Jan. 6, 2008, pp. 35-40.*

(Continued)

*Primary Examiner* — Khanh T Nguyen
(74) *Attorney, Agent, or Firm* — Jackson Walker LLP (57) ABSTRACT

A composite material responsive to mechanical and/or electrical stress comprises at least one substantially non-conductive binder and at least a first electrically conductive filler. The conductivity of the composite material in an unstressed state is related to the conductivity of the at least one substantially non-conductive binder and in a stressed state to the conductivity resulting from the presence of the at least first electrically conductive filler in the composition. The first electrically conductive filler is comprised of magnetite particles in a particle size distribution, and the at least one binder may include an oil, a gel, a wax a gel-wax, gel-ink or mixtures thereof.

8 Claims, 3 Drawing Sheets

(51) Int. Cl.
*G01L 1/20* (2006.01)
*H01B 1/24* (2006.01)

(56) References Cited

OTHER PUBLICATIONS

Fourth Office Action, CN Application No. 201980055409.4, Chinese Patent Office, including translation of first two pages, dated Aug. 6, 2023.

* cited by examiner

Figure 1

Electrode Base 1

Sensing Element 2

Conductive Bridge 3

Silicone Rubber Layer 4

COMPOSITE MATERIALS

FIELD OF THE INVENTION

The invention relates to composite materials exhibiting quantum tunnelling which comprise a conductive filler and a non-conductive binder, the binder being preferably in the form of an oil, wax, gel or gel/wax, a gel-ink or mixtures thereof and to sensors made from such composite materials

BACKGROUND OF THE INVENTION

Composite materials that exhibit quantum tunnelling and using oils, waxes and gels as a matrix can produce novel materials with unique and useful functionalities.

It is known that composites comprising polymer binder matrixes containing quantities of magnetite particles with specific dimensions and morphology can demonstrate electrical conduction ranges which can be varied over many orders of change by the application of mechanical pressure or electrical voltage. The electrical and mechanical properties of the polymer component of the matrix are required to have a low level of electrical conductivity and preferably be an electrical insulator with a level of flexibility which allows it to deform under pressure and return to its start state when the pressure is removed. The matrix component would normally have a resistance of more than $10^9$ ohms in its quiescent state to work as an effective binder in these composites and the mobility of the polymer and its response to pressure when loaded with the magnetite particles is fundamental to the sensitivity of the composite's response to an applied force.

These sensors are described in the applicant's international patent application published under number WO 2017/103592.

In WO 2017/103592 flowable polymers with high electrical resistance after setting or cross-linking are used as the binder matrix for the composite. Intimate mixing of the filler powder and the polymer is achieved with a low shear mixing regime for the shortest time needed to coat the individual powder particles and ended at that point to reduce possible aggregation of individual particles. The polymer may be in a liquid form at room temperature and set or cross-linked using chemical additives or an input of energy such as heat or microwaves. Many types of thermoplastic and thermoset polymers have been found to be useful as a binder matrix in the invention described in WO 2017/103592, but the cross-linking of polymers places an ultimate limit on the mobility of the polymer which is fundamental to the sensitivity of the composite. It would be an advantage if a more mobile form of matrix binder could be used to make more sensitive composites.

In this specification references to mixing in a low shear mixing regime means intimate mixing of the filler powder and the binder achieved with a low shear mixing regime for the shortest time needed to coat the individual powder particles. Mixing ends at that point to reduce possible aggregation of individual particles. Detection of the end point can be achieved by eye, that is observation by the person carrying out the mixing, whether the mixing is done using hand tools (such as a spatula) or powered tools, or by trial and experiment the end point may be correlated to a particular measurable parameter of a mixing machine, such as motor torque.

It would also be advantageous to make forms of the composite which could provide an historic record of the input of the mechanical or electrical force applied to them.

It would also be advantageous to make sensors utilising a more mobile form of matrix binder.

SUMMARY OF THE INVENTION

Surprisingly, it has also been found that oils, waxes and gels, and combinations of them, can be used as the binder matrix when loaded with particulate forms of magnetite with specific morphologies and dimensions to form a composite material that responds to mechanical pressure and electric charge by altering its electrical resistance, impedance or capacitance. The different mobilities of oils, waxes and gels provide a matrix which can produce useful forms of sensor materials that can, in some cases, respond, operate or recover differently from the sensors described in WO 2017/103592. In that document it is stated: 'the polymers used in the invention have inherent flexibility and revert to their quiescent state when the operating force is removed'. This reversion to a point close to the quiescent start state is provided by the polymer used having a degree of inherent elasticity.

According to a first aspect of the invention there is provided a composite material responsive to mechanical pressure and/or electric charge, the composite material comprising at least one substantially non-conductive binder and at least a first electrically conductive filler, wherein the conductivity of the composite material in an unstressed state is related to the conductivity of the at least one substantially non-conductive binder and in a stressed state to the conductivity resulting from the presence of the at least first electrically conductive filler in the composition, characterised in that the first electrically conductive filler is comprised of magnetite particles.

The electrical resistance of the composite material changes anisotropically immediately beneath and immediately around the point of exertion of pressure on the composite material, but not elsewhere in the composite material, the change in resistance being in accordance with the pressure exerted thereon, the resistance reducing with increased applied pressure and increasing with reduced applied pressure, between the quiescent state in the absence of pressure and the electrically conducting state when the composition is subject to an applied pressure.

Stressing of the composite may include mechanical and/or electrical stressing.

Preferably, the binder forms a layer around each electrically conductive particle. The binder fills the interstices between the electrically conductive filler particles, insulating adjacent particles from each other. The composite materials that are the most sensitive to stress are those where the minimum amount of binder is used to fill the interstices. Some of the electrically conductive particles may be coated with binder to thicknesses at molecular levels.

Preferably, the at least one binder is inelastic or elastic.

The at least one binder may include an oil, a gel, a wax, gel wax, gel-ink or mixtures thereof. A gel-ink is formed by mixing a gel with an ink to form a printable fluid.

It is preferred that the magnetite particles have a plurality of planar faces, adjacent planar faces connected at a vertex, the particles each having a plurality of vertices wherein the magnetite particles are irregular in shape and have a low aspect ratio.

Advantageously, the shape of the first electrically conductive particles in the distribution fall under the particle shape definitions of, "oblate", that is tabular, and/or "bladed", that is a flat or elongated shape form.

The distribution of particle size of the first electrically conductive particles at $d_{50}$ may be between 50 and 75 micron and preferably, the distribution of particle size of the first electrically conductive particles at $d_{50}$ is between 60 and 65 micron, and more preferably the distribution of particle size of the first electrically conductive particles at $d_{50}$ is be between 20 and 25 micron, and still more preferably, the distribution of particle of the first electrically conductive particles size at $d_{50}$ is be between 5 and 15 micron, and yet more preferably, the particle size of the first electrically conductive particles at $d_{50}$ is 10 micron. The distribution of particle size of the first electrically conductive particles at $d_{50}$ may be between 4 and 10 micron, and preferably, the distribution of particle size of the first electrically conductive particles at $d_{50}$ is between 6 and 9 micron, and more preferably the distribution of particle size of the first electrically conductive particles at $d_{50}$ is be between 6 and 8 micron, and still more preferably, the distribution of particle of the first electrically conductive particles size at $d_{50}$ is 7 micron.

In another embodiment the particles of the first type of electrically conductive particles have a size of up to 1 micron. The distribution of particle size of the second type of electrically conductive particles may have a size from $\frac{1}{100}$th of 1 micron up to 1 micron. Or, the second type of electrically conductive particles may be comprised in a distribution of particle sizes from less than 1 micron to 15 micron.

Advantageously, the distribution of particle sizes between sub-micron and tens of microns in the quantity of magnetite particles includes sub-micron sized particles and particles that are tens of microns in size.

The composite material may further comprise a second type of electrically conductive particle of a different shape to the first electrically conductive particle.

The second type of electrically conductive particle may have one of the following shapes: void bearing, plate like, needle like and spherical.

Preferably, the second type of electrically conductive particle is selected from the group comprising: silver; nickel; copper, iron, oxides of the aforesaid metals, conductive forms of carbon such as carbon black, carbon nanotubes, graphite and graphene.

Advantageously, the first and second electrically conductive fillers are mixed in the proportion by weight of 75-99 parts of first electrically conductive filler to 25-1 parts of second electrical conductive filler in a total of one hundred parts.

Where the second electrically conductive filler is graphite it is preferred that the proportion by weight of graphite to magnetite is not greater than 1.3 to 10 and is preferably 1 to 10. If a start resistance is required a proportion of graphite to magnetite greater than 1.3 to 10 may be used.

In one embodiment, the particle size of the second type of electrically conductive particles is between 10 and 15 micron.

The invention also provides a process for manufacturing a composite material according to the first aspect of the invention comprising the steps of:

providing the substantially non-conductive binder and the electrically conductive filler; and mixing the at least one substantially non-conductive binder and at least a first electrically conductive filler in a low shear mixing regime until the electrically conductive filler particles are coated with the binder.

In another embodiment the particles of the second type of electrically conductive particles include particles having a size of less than 1 micron. All the particles of the second type of electrically conductive particles may have a size of less than 1 micron. Or, the second type of electrically conductive particles may be comprised in a distribution of particle sizes from less than 1 micron to 15 micron.

The proportion by weight of binder to electrically conductive filler may be between about 10:1 and about 1:10.

According to a second aspect of the invention there is provided a sensor comprising a body, the body including a composite material and electrical contacts connected to the body.

It is preferred that the composite material is a composite material according to the first aspect of the invention.

Advantageously, the sensor further comprises a substrate, wherein the composite material of the body is situated on the substrate.

The composite material may be formed as a layer on the substrate. The layer may be a thin layer and may be as thin as the largest particle in the distribution of magnetite particles.

The binder may be a hard wax.

The body may be configured as a sensing anvil. The sensor may further comprise a piston with a spring return.

The sensor may be configured for sensing volatile organic compounds, for example by laying down the composite material in a thin layer (at a minimum thickness corresponding to the size of the largest particle in the composite material) and/or by charging the composite material.

The body may include a member having plurality of openings therein, the openings filled with the composite material.

One of the functions of the member is to provide a uni-directional reinforcement to reduce the response of the sensing element to perpendicular forces and to focus tangential forces into the pressure sensitive composite material, thereby to increase the sensitivity of the sensor's response to tangential forces.

Another function of the member may be to assist in returning the composite to its pre-stressed state after removal of the source of stress, such as a mechanical force.

Advantageously, the member is a textile or an open cell foam and the openings filled with the composite material are openings within the textile, cells within the foam, holes in a 3d printed structure, or holes in a non-conductive material such as a sheet material.

Preferably, the composite material and the member are of equal thickness.

The composite material may be thicker than the member, and may extend to include a surface layer across one of or both surfaces of the member.

The electrical contacts may comprise a base electrode and at least one peripheral electrode. The electrical contacts may include a plurality of peripheral electrodes, for example four peripheral electrodes which may be spaced apart equidistantly from each other. The base electrode and the at least one peripheral electrode may be situated to one side of the body. The number of peripheral electrodes may be varied. A sensor capable of sensing shear force can be formed using only one peripheral electrode. However, by providing two, three or more peripheral electrodes the direction of application of shear force can be resolved. Increasing the number of peripheral electrodes provides improved resolution of the direction of shear force applied.

The electrical contacts may include a conductive bridge. The conductive bridge may be situated to the other side of the body to the electrodes.

Advantageously, the body and at least a part of the base electrode, and where present the conductive bridge, are encapsulated in an encapsulating material to provide protection and support. The encapsulating material may assist in returning the sensor to its quiescent start condition.

The sensor may be self-resetting. Where the sensor includes the member having a plurality of openings therein, the member may be resilient, the resilience of the member providing a restoring force upon application of pressure to return the binder to its condition prior to the application of pressure.

The sensor maybe particularly adapted for sensing shear forces and in such shear force sensor it is preferred that the binder is a gel, a gel ink or a gel-wax. It is also preferred that the body includes the member having plurality of openings therein, the composite material filling the openings. In such an embodiment the openings serve to restore the composite material to its pre-stressed state and also to concentrate the action of the applied forces applied tangentially to the main axis of the sensor. The surface energies of the composite material bind it loosely to the surface of the electrodes and to the conductive bridge when this component is a part of the sensor. Any tangential force will alter the resistance within the composite in line with the direction of the force.

The sensor may be configured such that the composite material is pre-charged and discharges upon the application of stress. The stress may be pressure and the composite material may be sensitive to increasing pressure after the initial application of pressure.

The voltage required to pre-charge the composite material depends on the specific configuration of the composite material. For example, where the electrically conductive filler is a 1 to 10 mix by weight of graphite to magnetite a voltage of 150 volts DC at current of a few micro amps or less is sufficient to provide a permanent start resistance in the composite. By adjusting the relative amount and types of first and second electrically conductive filler lower voltages (for example 100 volts) may be used.

Other configurations of composite may require much higher voltages, for example 800 volts, to set them to a steady conductive state. The less sensitive the composite is to mechanical pressure, the greater the voltage needed to change the composite to a steady conductive state. The mechanical force input required to initiate a change of resistance in a charged composite varies with the sensitivity of the composite and its state of charge, but is always less than the force required to achieve a similar resistance change from the same composite in an uncharged state with a similar area of actuation. The response of an application of force to a charged sensor is an immediate increase in resistance as charges dissipate; once the associated charges have dissipated the resistance will drop as the applied force increases.

The composite material of the invention exhibits an anisotropic response to stress, whether the stress is mechanical or electrical. Where an applied stress is mechanical the resistance of the composite changes only at and immediately around the point of application of a mechanical force. In the case of electrical stress, the composite only becomes charged around the area of contact of the electrodes through which charge is applied. For example, if one electrode is a large sheet coated with the composite and the other electrode is a 6 mm diameter rod applied perpendicularly to the other side of the composite the charge will be induced only in the area below and immediately around the 6 mm electrode when a voltage is applied and the rest of the composite would remain uncharged.

If the 6 mm electrode is replaced with a second sheet, the whole of the composite layer becomes charged when a voltage is applied. When a force is applied at a point the composite discharges at and around the point of application of pressure only.

The member may be a non-woven fabric and may provide a grid of openings, or the member may be a woven or knitted textile, the openings provided by the spaces between adjacent yarns of the textile. Alternatively, the member may be a sheet material having the plurality of holes punched, drilled or otherwise formed therein.

According to a third aspect of the invention there is provided a yarn or a fabric formed from yarn having the composite material of the first aspect of the invention applied thereto.

DETAILED DESCRIPTION OF THE PREFERRED EMBODIMENTS OF THE INVENTION

LKAB of Sweden provide natural magnetite of different particle sizes which has been used in this invention. Alternatively, natural magnetite from New Zealand's north island has been found to work in the invention when comminuted and sized and sorted by sieving.

Table 1 below sets out four different types size distributions of magnetite available from LKAB.

TABLE 1

| | Example 1 Magnetite - Magnif 10 | Example 2 Magnetite - Magnif 25 | Example 3 Magnetite - Magnif 50 | Example 4 Magnetite - Magnif EX014 |
|---|---|---|---|---|
| Particle size distribution (cyclosizer method) | | | | |
| d10 (micron) | 5 | 6 | 9 | 3 |
| d50 (micron) | 10 | 22 | 63 | 7 |
| d90 (micron) | 25 | 50 | 180 | 13 |
| particle characteristics | irregularly shaped, low aspect ratio | irregularly shaped, low aspect ratio | irregularly shaped, low aspect ratio | irregularly shaped, low aspect ratio |

In these tunnelling composites the dispersed nature of the thinly coated particles provides the particles with electrical anisotropic isolation. This isolation forms the basis for tunnelling conduction when particles move closer together under an applied force or when they are responding to a charge-induced force. This isolation of individual particles also makes the response of the composite to alternating currents (and therefore its impedance characteristics) different from the response seen in the common percolative composites where the particles are mainly connected to each other. The inherent electrical capacitance of tunnelling composites is also different from percolative composites as each isolated particle in tunnelling composites has its own charge capability and this provides unique capacitive effects and also forms the basis for the unique charge effect seen in these composites.

In the case of oils, waxes and gels, when used as a binder matrix for heavy loadings of magnetite particles, that is greater than the recognised threshold of 30% by weight of magnetite at which percolate conduction occurs, the inherent elasticity can be almost nil in the case of light oils, hard waxes and soft gels in an unrestrained deposition of the composites but can be more substantial in the case of a similar deposition of a composites made with thicker oils, softer waxes or firmer gels because of surface energies associated with the interface between the binder matrix and the magnetite filler particles. Surprisingly, the surface energies associated with oils, waxes and gels can be usefully employed in these composites to fix them to many different surfaces and within interstices such as those associate with foams and textiles. The loose bonding that results from the use of oils, waxes and gels using surface energy bonding has provided a means of depositing the composites on associated electrodes in a thin, and when required, flexible form. The type of electrode materials chosen will have an effect on the ultimate bonding achieved using surface energies. Surface energies of different materials are well known and referenced in available literature. The surface energy of some binders can provide a return response mechanism for some composites with matrixes having low elasticity if they have been deposited in very thin layers.

The inherent mobility of some oils, gels and waxes can be used as the binder matrix to produce very sensitive responses to mechanical forces and electric charge when used in this invention. Thin layers are more sensitive in their response to applied mechanical forces than thick layers. Layers can be as thin as the largest dimension of the particles used and thin layers respond more rapidly and require less mechanical actuation force than thicker layers.

Thin layers hold less electrical charge than thick layers but show a very sensitive response to mechanical forces when charged. Charge can be applied to the composite incrementally by applying a number of small charging voltages one after the other until a filled charge state is reached and no further charging can occur. In this state the composite material has a low resistance. A small mechanical force input will initiate a discharge of the accumulated charge and when completely discharged the same layer will have a high resistance and can then act as a lower sensitivity pressure sensor over a large resistance range, the resistance reducing with increasing pressure. Such a charged composite can also function as a one shot sensor, that is a mechanical force on the charged composite is indicated by the resistance of the composite changing from a low resistance to a high resistance.

This pre-charged configuration is useful in providing a first-touch sensor, which is then sensitive to increasing pressure.

Thin layers when charged can also provide a sensitive response when exposed to certain volatile organic compounds (VOCs). A thin layer provides a faster response to a VOC than a thick layer.

A one-shot device has been described above for a charged composite. Another form of one-shot sensor can be produced using hard wax as the basis for the composite. A paraffin wax composite with little or no inherent elasticity can show a history of actuation. A sensing anvil produced from the wax composite can be made to deform under an applied force delivered by a piston with a spring return. Any permanent indentation of the hard wax anvil will be electrically measurable as a permanent resistance change.

Sensors with a self-resetting action can be produced when an oil, gel or wax with an inherent elasticity is used as a binder matrix whilst matrices with little or no elasticity can be used to provide a history of the forces applied to them. The history is produced by a mechanical force introducing a lasting compression in the inelastic material that results in a reduced electrical resistance the level of which provides an indication of the force applied. In the case of electric charge, the charge level is proportional to the voltage applied. This history can be a single event or a summation of a number of events and applies to events which can be introduced directly by a mechanical or electrical force applied to the composite or indirectly by the influence of external forces on a pre-charged body of the composite.

Many types of oils can be used in this invention including silicone oils. An example of a silicone oil based composite can be produced by adding 5 parts (by weight) of magnetite LKAB Mag10 to 1 part of silicone oil—Dow Corning 200/50. The resulting composite paste can be spread onto a surface to adhere by surface tension or held in a form of container or in the interstices of a textile weave, non conductive mesh, or open cell foam.

Many waxes are useful in this invention including animal, plant and petroleum-based waxes. An example of a wax composite can be produced using paraffin wax Kerawax 422 manufactured by Kerax which can be heated to allow the incorporation by stirring of magnetite LKAB Mag 10 in the ratio (by weight) of 4:1 magnetite to wax.

This produces a hard composite material which will respond to mechanical and electrical pressures but has very little elasticity at room temperature.

Gels useful in this invention include but are not limited to physical and chemical bonded gels an example of which is petroleum gel Technijell 9628 manufactured by Kerax mixed 1:4 by weight with LKAB Mag 10. This produces a soft, spreadable composite material which has very little elasticity at room temperature unless used in a very thin layer.

Suitable oils waxes and gels can be used in combination in this invention to provide a range of different mechanical onset and recovery responses. A gel-wax combination suitable for use as a matrix binder is described in U.S. Pat. No. 6,881,776. This gel-wax can be heated to incorporate LKAB Magnif 25 magnetite in the ratio of 1:6 (gel-wax to magnetite) by weight to make a soft gel composite which is yielding and elastic at room temperature.

Whilst thin layer sensors have been described above, thick layer sensors may also be made according to the invention. One such sensor was manufactured using the gel-wax described in U.S. Pat. No. 6,881,776. The composite material comprised said gel-wax and magnetite in the form of Magnif 50 supplied by LKAB in the proportion by weight of ten parts Magnetite to one part gel-wax, mixed intimately. A body of the composite was formed 1 cm thick on an aluminium foil electrode. A second aluminium foil electrode was placed on top of the body of composite material. A voltage of 5 volts was applied to the electrodes. Without additional pressure on the foil electrodes no current passed through the composite material. When pressure was applied to one of the electrodes a current passed through the composite material, and as the applied force increased the current increased indicating reducing resistance of the composite material with increasing applied force.

The above embodiments respond to the input of mechanical or electrical forces by changing their electrical resistance, impedance and capacitance. The action and recovery of a sensor matrix made with oils, gels, waxes or combinations of these materials are a product of the initial mobility and subsequent recovery capability of the binder matrix in response to an actuating force or forces. These composites can be compounded in extremely sensitive forms to provide an electrical resultant or mechanical history of an applied force or series of forces when used in suitable sensing arrangements. They can be applied directly to suitable conductive surfaces which can be part of an electrode system. They can be applied to a surface using heat and retained in a working position by surface tension effects or held in some form of containment. They can also be put into the interstices of textiles, foams, other materials having interstices or onto suitably prepared conductive and semi-conductive surfaces.

It has been found that including a second conductive filler in the form of graphite increases the response of the composition to pressure, that is with an increasing proportion of graphite in the composition a greater change in resistance occurs for application of the same pressure. This is discussed in greater detail in relation to Example 1 below.

EXAMPLES

Force v Resistance has been tested for a number of examples. The results of these tests are set out below:

Example 1—The Effect of a Second Conductive Filler in the Form of Graphite

An experiment was performed which involved mixing graphite in 0.1 g increments up to 0.8 g with 10 g of Magnif 10. The resulting mixed powders were placed in a shallow stainless-steel cup measuring 2 cm high and 4 cm in diameter. A 133 g brass weight having a base with a 25 mm diameter was used as a top electrode, the stainless-steel cup being the bottom electrode. The stainless-steel cup was tapped following placement of the powder therein in order to flatten the surface of the powder. The brass weight was then placed on the powder.

TABLE 2

Results for Example 1

| Magnetite | graphite | resistance |
|---|---|---|
| 10 g | 0.0 g | 15M Ohms |
| 10 g | 0.1 g | 13M Ohms |
| 10 g | 0.2 g | 11M Ohms |
| 10 g | 0.3 g | 10M Ohms |
| 10 g | 0.4 g | 9M Ohms |
| 10 g | 0.5 g | 6.5M Ohms |
| 10 g | 0.6 g | 2.5M Ohms |
| 10 g | 0.7 g | 500K Ohms |
| 10 g | 0.8 g | 5K Ohms |

In each case the start resistance of the mixed powders in the absence of pressure was greater than $10^9$ Ohms.

Whilst the experiment of Example 1 was performed with the powder in the absence of any binder, Example 6 demonstrates that the effect of a greater change in resistance upon the application of pressure carries through to a composition of the powder in a binder.

Example 2—The Effect of Force on Resistance on a Composite Comprising Magnetite and an Oil Silicone oil in the form of Dow Corning 200/50 silicone oil was mixed with LKAB Magnif 10 magnetite in proportions by weight from 1:1 oil to magnetite to 1:5 oil to magnetite.

Table 3 illustrates the effect of force on resistance of a silicone oil/magnetite composition comprising Dow Corning 200/50 silicone oil and LKAB Magnif 10 magnetite mixed together in a low shear mixing regime in the ratio 1:4 by weight.

TABLE 3

| Force applied g | 4 | 230 | 370 | 439 | 646 | 1055 | 2169 | 4920 |
|---|---|---|---|---|---|---|---|---|
| resistance (Ohms) | $10^9$ | $10^8$ | $10^7$ | $10^6$ | $10^5$ | $10^4$ | $10^3$ | $10^2$ |

Composites formed with oils are useful with textiles, for example: yarns, woven fabrics, non-woven fabrics, knitted fabrics, and also nets, and open cell foams to form sensor materials. The composite formed with silicone oil does not change significantly the mechanical properties of the textile, net or open cell foam. Hence, the softness and flexibility of a textile prior to application of the oil-based composite, are not affected to a significant degree by application of the oil-based composite.

Very thin coatings of the oil-based composite can be achieved. This allows lower proportions of the electrically conductive filler to be used to achieve the desired sensitivity for the sensing task in hand (the sensitivity of the composite increases with decreasing layer thickness).

Whilst the example uses a silicone oil other oils such as synthetic and/or minerals oil may be used.

Example 3—The Effect of Force on Resistance of a Composite Comprising Magnetite and a Gel Silicone gel in the form of Cetelec 'One-Gel'™ available from Etelec, Italy was first thinned with petroleum spirit (1:1 gel to petroleum spirit). The thinned gel was mixed with LKAB Magnif 25 magnetite such that after evaporation of the petroleum spirit the ratio of gel to magnetite was 1:3 to 1:5 gel to magnetite (by weight). The tack and flexibility of the composite is reduced as the proportion of magnetite is increased.

Gel composites are particularly useful in the manufacture of flexible sensors, where the gel composite is applied to textiles, for example: yarns, woven fabrics, non-woven fabrics, knitted fabrics, and also nets and open cell foams. It has been found that gel composites are especially useful in the construction of a shear force sensor. That is, a sensor for sensing a force that is applied parallel or tangentially to the face of the sensor rather than perpendicular to the face of the sensor.

Table 4 illustrates the effect of force on resistance of a silicone gel/magnetite composition comprising One-Gel (silicone gel) and LKAB Magnif 25 magnetite mixed together in a low shear mixing regime in the ratio 1:5 silicone gel to magnetite (by weight).

TABLE 4

| Force applied g | 0 | 2 | 43 | 102 | 224 | 540 | 1732 | 4903 |
|---|---|---|---|---|---|---|---|---|
| resistance (Ohms) | $10^9$ | $10^8$ | $10^7$ | $10^6$ | $10^5$ | $10^4$ | $10^3$ | $10^2$ |

Example 4—The Effect of Force on Resistance on a Composite Comprising Magnetite and a Gel-Wax Table 5 illustrates the effect of force on resistance for a sensor comprising a gel-wax composition of a gel-wax of the type described in U.S. Pat. No. 6,881,776 and LKAB Magnif 25 magnetite mixed together in a low shear mixing regime in the ratio 1:8 by weight, and one of two types of net. Each net was 0.3 mm thick with 256 holes per square inch. The composition was forced into the holes in the net so that the composite was the same thickness as the net.

One of the nets (net A) was formed from a soft polyester multi-strand yarn, the other (net B) being a hard nylon dual strand net.

A test force was applied perpendicular to the surface of the resulting sensor.

TABLE 5

| Force applied g (Net A) | 27 | 48 | 166 | 294 | 440 | 742 | 1418 | 2820 |
|---|---|---|---|---|---|---|---|---|
| Force applied g (Net B) | 281 | 393 | 952 | 1215 | 1304 | 2014 | 3182 | 4825 |
| resistance (Ohms) | $10^9$ | $10^8$ | $10^7$ | $10^6$ | $10^5$ | $10^4$ | $10^3$ | $10^2$ |

Example 5—The Effect of Force on Resistance on a Composite Comprising Magnetite and a Wax Table 6 illustrates the effect of force on resistance for a sensor comprising a wax composition of Kerawax paraffin wax combined with LKAB Magnif 25 magnetite mixed together in the ratio 1:3 by weight. Prior to mixing the wax was melted over heat, the magnetite being stirred into the molten wax over the heat. The composition was coated onto a metal sheet to a coating thickness of 0.5 mm.

TABLE 6

| | Force applied g | | | |
|---|---|---|---|---|
| | — | 15 | 1890 | 4994 |
| resistance (Ohms) | $10^9$ | $10^7$ | $10^6$ | $10^5$ |

The wax was deformed permanently by the application of the forces of 1890 and 4994 g.
Forces over 5000 g made this particular wax composite crack.
In Examples 2 to 5 the top and bottom electrodes were aluminium foil.

Example 6—The Effect of Force on Resistance on a Composite Comprising Magnetite and Graphite and an Oil LKAB Magnif 10 was mixed with graphite powder in a ratio of 90.5:9.5 by weight by stirring the two powders together. The mixed powders were mixed into a silicone oil binder. The silicone oil was Dow Corning 200/50 silicone oil which can be mixed with mixed powders of LKAB Magnif 10 magnetite and graphite in proportions by weight from about 1:1 oil to magnetite/graphite powder to about 1:6 oil to magnetite/graphite powder. In this example a ratio of 1:3 silicone oil to the mixed magnetite/graphite powder was used.

Example 7—The Effect of Mixing Small Proportions of Magnetite Filler with Different Binders A loading of magnetite filler to binder 1:10 by weight was selected, the magnetite filler being LKAB Magnif 50 magnetite. Whilst all of the LKAB magnetites shown in Table 1 can be used to provide different ranges of basic sensitivities to the composites, Magnif 50 is the most sensitive of the Magnif range for use in thin laydowns of low loadings.

The binders used were: gel (Vaselin), oil (Dow Corning silicone oil 200/50), wax (Kerawax KW422) a gel/wax combination (Mindsets FF1 003—of the type described in U.S. Pat. No. 6,881,776) and a silicone gel (Etelec One Gel).

For force measurements the composite was applied to the interstices of a 150 micron thickness fine organza net to assist the composite's recovery from compression as well as providing a flat surface with a known thickness of 150 microns. This was placed on top of a nickel plate which provided the base electrode. A 5 mm diameter top electrode was used to apply a force to the sample under test. All the composites could operate without the associated textile just by coating them direct onto an electrode surface prepared by gravure or other shaping or surface preparation technique including dry and wet printing, within inks or additively as an additional process.

The Gel/wax binder (Mindsets FF1 003—of the type described in U.S. Pat. No. 6,881,776) and the silicone gel (Etelec One Gel) both had sufficient elasticity under most circumstances to operate without a support such as a textile structure or other substrate. The paraffin wax could also operate without a textile structure but the textile assists in preventing it cracking under load. Textiles also feature in our shear sensor to control the direction and detection of applied forces.

The composite formed with Gel/wax binder (Mindsets FF1 003—of the type described in U.S. Pat. No. 6,881,776) the results for which are shown in the bottom row of Table 8 below was spread without a net directly onto the electrode at 150 microns thickness.

All the composites had a no-load start-resistances above 1 billion Ohms and all gave a continuous decrease in resistance as an increasing pressure was applied. The gel\wax and silicone gel composites showed a reasonable capability to recover from an applied force without assistance and both these gels demonstrate the sort of flexibility needed to respond to direct or tangential forces if used in a shear force sensor. The performance of composites as shear force sensors made with these binders is improved by embedding the composite within the interstices of a textile as described above and in relation to FIGS. 2 and 3.

The sensors were tested by applying an increasing pressure and noting the pressure reading at $10^9$ Ohms and $10^1$ Ohms. With the exception of the hard-wax sensor, they all showed great sensitivity across a very large resistance range.

Details of the main experiment are tabulated in Table 7 below:

TABLE 7

| Binder Type | Force at $10^9$ Ohms | Force at $10^1$ Ohms | Binder Trade Name |
|---|---|---|---|
| Petroleum Jelly | 85 g | 790 g | Vaseline Original |
| Silicone Oil | 120 g | 2390 g | Dow 200/50 |
| Paraffin Wax | 175 g | 5 Kg (150 Ohms) | Kerawax KW422 |
| Gel/wax | 90 g | 2300 g | Mindsets FF1 003 |
| Silicone Gel | 72 g | 2860 g | Etelec (silicone One Gel) |
| Gel/wax | 10 g | 1560 g | Mindsets FF1 003 |

Example 8—The Effect of Mixing Large Proportions of Magnetite Filler with Different Binders An experiment was conducted on a Gel/wax composite consisting of a 10:1 by weight of Magnif 50 to Gel/wax (Mindsets FF1 003). This high loading allowed thick sections of composites to be formed. A 16.5 mm square cube of the composite was produced and its response to force measured using the same electrodes as used in the above experiment.

The composite had an uncompressed resistance above $10^9$ Ohms and a force of 20 g was required to bring it to $10^9$ Ohms and a further increase of force to 2.5 Kg resulted in a resistance of 2K Ohms at which point the force was released and the composite returned to its quiescent state with an inherent resistance above $10^9$ Ohms.

Two sensors were constructed by placing a 50 mm square piece of Lycra™ net having a thickness of 0.27 mm and 1024 holes per square inch on a flat nickel electrode plate.

One of the sensors was constructed using the composition described in Example 6 and the other with the composition described in Example 2. In each case the composition was applied to a region of the net such that the region the holes were filled with the composite and the composite was the same thickness as the net, that is the composite did not form a layer above or below the net. An aluminium foil electrode was placed on top of each composite. The sensors were each placed in a force tester. In the force tester a force of up to 4 kg was applied progressively via a gold plated flat-faced top electrode having a diameter of 6 mm.

Figure 1:
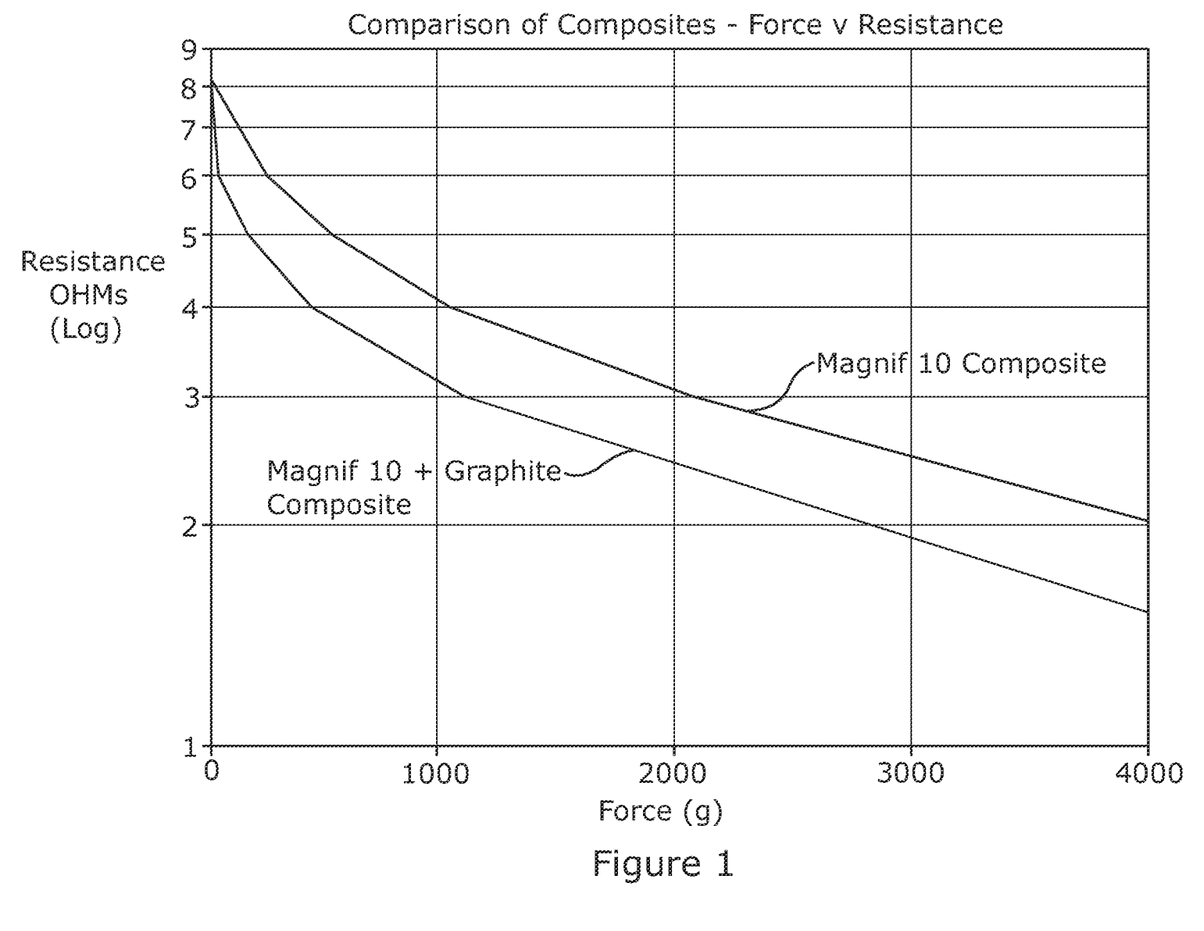
FIG. 1 is a graph showing force in grammes versus the log of resistance in Ohms.

The results for force v resistance are shown in the graph of FIG. 1. It is evident that the composition that includes graphite has a greater change in resistance for the same applied force. This corresponds to the results of Example 1, which does not include a binder.

Figure 2:
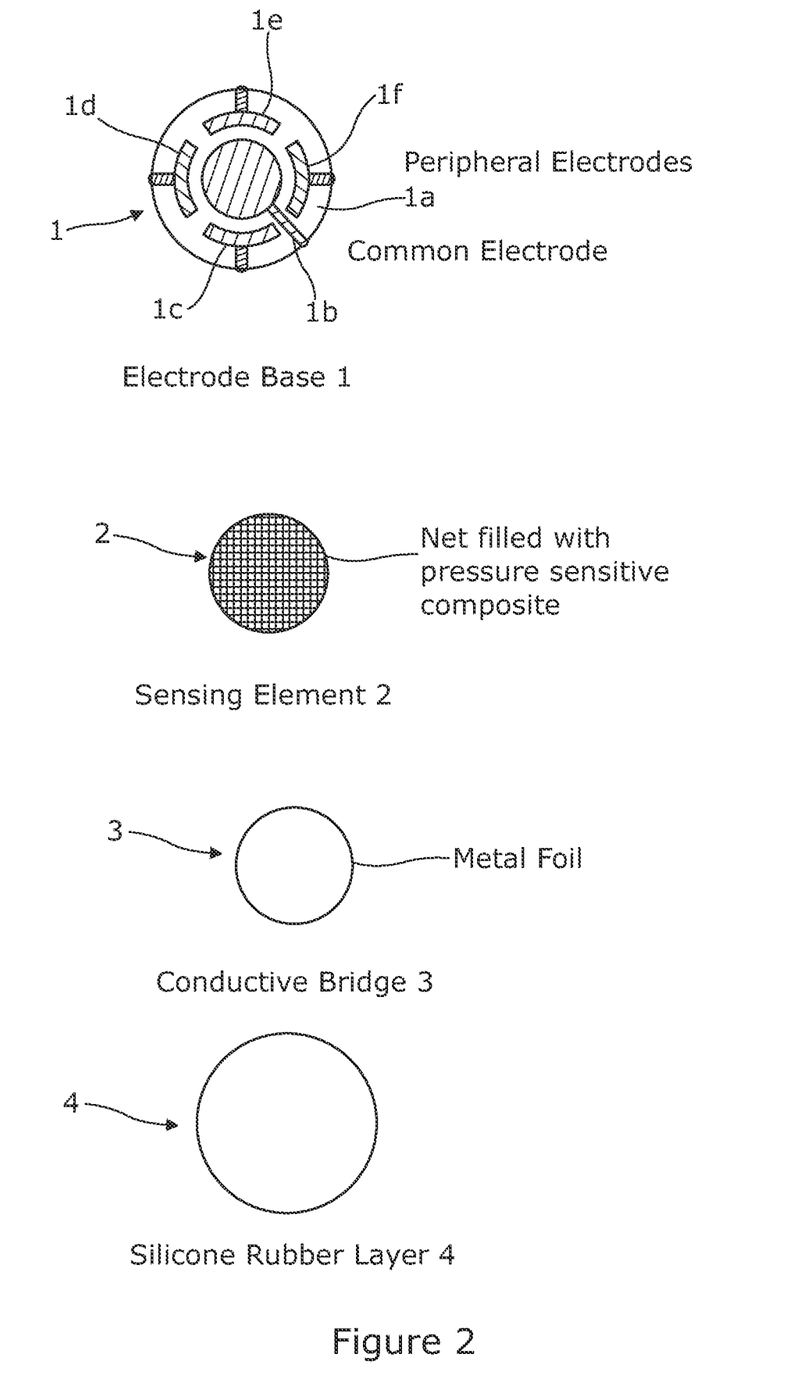
FIG. 2 is a schematic representation of the component parts of a sensor of the invention.
Figure 3:
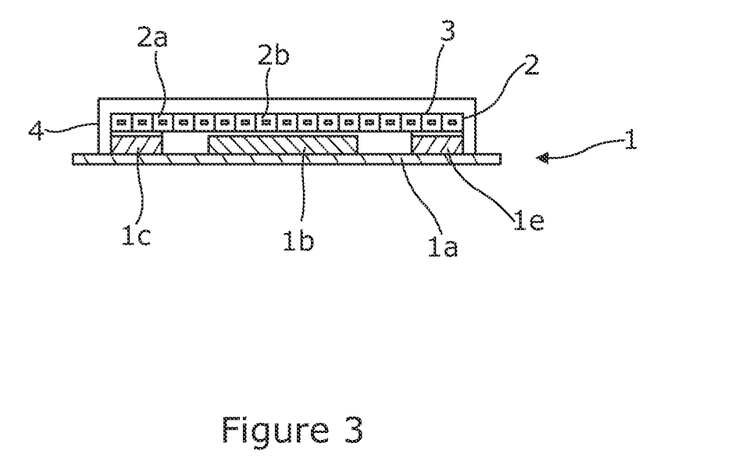
FIG. 3 is a cross-section through the sensor of FIG. 2 in an assembled state.

FIGS. 2 and 3 illustrate a shear force sensor which comprises an electrode base 1, a sensing element 2, a conductive bridge 3 and an insulating cover 4.

The sensing element 2 comprises a net 2a filled with a composition 2b comprising one or more electrically conductive filler (such as magnetite or magnetite and graphite) in a binder that is an oil, gel, wax, gel-wax or gel-ink. The composition could be a composition of the type described in one of the examples above. The net 2a forms a plurality of adjacent cells each filled with composite material 2b. The composite material 2b has the same thickness as the net 2a in the illustrated example and this is preferred.

The electrode base 1 may be printed on a suitable substrate which may be flexible or stiff. The electrode base 1 may be formed as a printed circuit board or component thereof. As can be seen from FIG. 2, the electrode base 1 includes a substrate 1a, a common electrode 1b and peripheral electrodes 1c-1f. The sensing element 2 is placed on top of the electrode base 1, with the lower surface of the sensing element 2 in contact with the common electrode 1b and the peripheral electrodes 1c to 1f. The conductive bridge sits on top of and in contact with the upper surface of the sensing element 2. The illustrated example shows four peripheral electrodes. This number may be varied. A sensor capable of sensing shear force can be formed using only one peripheral electrode. However, by providing two or more peripheral electrodes the direction of application of shear force can be resolved. Increasing the number of peripheral electrodes provides improved resolution of the direction of shear force applied.

The insulating cover 4 sits on top of the conductive bridge 3 and encapsulates the outer edge of the electrode base 1, thereby keeping all the components of the sensor in place. In another embodiment the insulating cover extends under the electrode base 1 thereby providing complete encapsulation of components 1 to 3.

A sensor of the type shown in FIGS. 2 and 3 can be manufactured in many different shapes and sizes, and may have different electrode layouts and/or different numbers of electrodes, the sensor illustrated in FIGS. 2 and 3 being only an example. The sensor element illustrated in FIGS. 2 and 3 has an overall thickness of about 1 mm. However, thinner or thicker sensors may be formed.

The net of sensing element 2 is preferred, the stiffness of the net sets the initial operating sensitivity response and the degree of selectivity to both perpendicular and tangential forces acting on the sensor during operation. The net also provides a restoring force to return the composition to its state prior to the application of pressure.

Whilst the examples relate to compositions in which the binder is an oil, gel, wax, gel wax, or a gel-ink sensors of the type illustrated in FIGS. 2 and 3 are not limited to such binders. The net could be filled with a pressure sensitive composite where the binder is a polymer binder for example of the type described in WO2017/103592.

The invention claimed is:

1. A composite material responsive to stress selected from the group of mechanical and electrical stress, the composite material comprising at least one non-conductive binder and at least a first electrically conductive filler, wherein the conductivity of the composite material in an unstressed state is related to the conductivity of the at least one non-conductive binder and in a stressed state to the conductivity resulting from the presence of the at least first electrically conductive filler in the composition, wherein the first electrically conductive filler is comprised of magnetite particles in a particle size distribution, and the at least one binder is inelastic and selected from the group comprising an oil, a gel, a wax, a gel-wax, a gel-ink and mixtures thereof, wherein the magnetite particles have a plurality of planar faces, adjacent planar faces connected at a vertex, the particles each having a plurality of vertices, and the binder fills interstices between the electrically conductive filler particles, forming a layer around each electrically conductive particle and insulating adjacent particles from each other.

2. A composite material according to claim 1, wherein the distribution of particle sizes is a selected one of the group of size ranges consisting of: sub-micron; between sub-micron and tens of microns; between one micron and tens of microns; between sub-micron and 10 microns; and between 1 micron and 10 microns.

3. A composite material according to claim 1, wherein the composite material further comprises a second type of electrically conductive filler particle.

4. A composite material according to claim 3, wherein the second type of electrically conductive particles have a shape and the shape of the second type of electrically conductive particles includes at least one of the group of shapes consisting of: void bearing, plate like, needle like and spherical.

5. A composite material according to claim 4, wherein the second type of electrically conductive particle is selected from the group consisting of: silver, nickel, copper, iron, oxides of the aforesaid metal, and conductive forms of carbon including, carbon black, carbon nano-tubes, graphite and graphene.

6. A composite material according to claim 5, wherein the second type of electrically conductive particle is graphite, wherein the composite material contains a proportion of graphite and a proportion of magnetite and the proportion of graphite to magnetite by weight is not greater than 1.3 parts of graphite to 10 parts of magnetite.

7. A composite material according to claim 4, wherein the particle size of the second type of electrically conductive particles is selected from the group consisting of: between 10 and 15 micron; less than 1 micron; and between less than 1 micron and 15 micron.

8. A composite material according to claim 1, wherein the composite material contains a proportion of binder and a proportion of electrically conductive filler, and wherein the proportion by weight of binder to electrically conductive filler is a selected one of the group consisting of: between about 10:1 and about 1:10; and between 1:3 and 1:6.

\* \* \* \* \*